5916X
E. Skinner,
Furniture Drawer.
Patented Apr. 13, 1830.
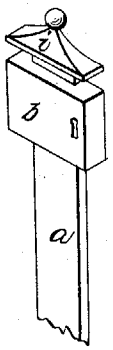
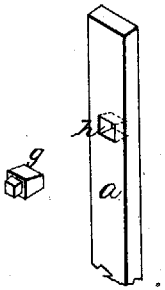
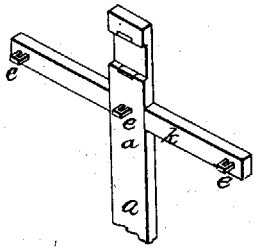
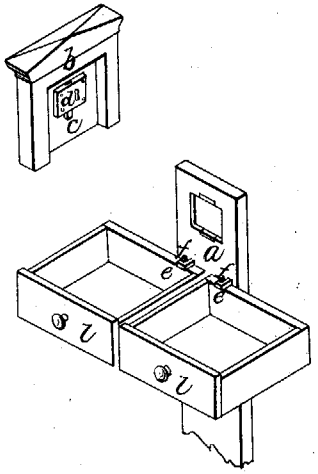
N. PETERS, PHOTO-LITHOGRAPHER, WASHINGTON, D. C.

April 13. 1830

Elijah Skinner of Sandwich, N.H.
Letters Patent. X5916

The schedule referred to in these Letters Patent & making part of the same containing a description in the words of the said Elijah Skinner himself of his improvement in the mode of locking drawers of furniture, called the saving lock.

---

To all to whom these presents shall come: Be it known that I Elijah Skinner of Sandwich, in the County of Strafford & State of New Hampshire, have invented certain new & useful improvements in the mode of locking drawers of furniture called the saving lock, for the purposes of locking & unlocking with one common drawer, or cup board lock or any similar lock any number of drawers in the same piece of furniture, & that the following is a full & exact description of the construction, operation & application of said lock, as improved by me. In the first place I make a slide of wood of sufficient length to reach from the bottom of the case thro' the top of the case, near the back board. I then make a small block of wood, the length of which is about equal to the width of the back board above the top of the case, in which block I make a groove large enough to receive the slide. I then place the slide into the groove & across them both, I counter sink a common drawer, cupboard or similar lock in such a position that the bolt of the lock, shall be sunk into the slide each end of the bolt resting upon the shoulder which is formed in the slide by counter sinking the lock so that when the bolt springs up & down it carries the slide with it, & in this way with the key of the lock, the slide is moved up & down at pleasure. The block of wood before mentioned I finish in any figure I please with a key hole in front_ I place it perpendicularly upon the back board about in the centre thereof with the lock toward the back board & the slide passing down thro' the top of the case, between the drawers & back ceiling into a mortise in the bottom of the case. Then in the front of the slide opposite the upper edge of each drawer, I fasten a staple, & in the edge of each drawer opposite the staples I counter sink a catch or pin in such a position that when the slide falls down by the turning of the key, the staples in the slide lock or catch on to the pins in the edges of the drawers, whereby all the drawers are Drawing in the Portfolio

X5916 locked or unlocked by turning the key. When a number of drawers are placed horizontally in the furniture, I let into the slide across piece, opposite to each tier of drawers, in which cross pieces, I fasten staples in such a position as to catch on to the pins in the drawers in the manner before described; but when there are only two tiers of drawers, I make the slide wide enough to receive both sets of staples without cross pieces. 2. another method I make the slide to fall short of passing thro' the top of the case in which & opposite the under side of each drawer, I fasten a staple, & then counter sink a pin or catch upon the back side in the under edge of each drawer. I then put upon one of the drawers, a common drawer, cupboard or similar lock & in the back side of the same drawer I fix a pin or cog of wood, projecting toward the back ceiling, the upper side of which is made off like a wedge, & in the slide opposite the drawer wherein the pin or cog is placed, I make a mortise conforming to the pin or cog & fitted to receive the same, so that when the drawer is pushed or thrown into its place, the pin or cog entering the mortise, throws up the slide & the staples slip on to the catches or pins in the under edges of the drawers; so that by locking the drawer upon which the common lock is fixed, all the drawers in the case are locked & by turning the key back & starting the drawer a little all are unlocked, & in this method any one drawer may be left unlocked, by starting it out a little while the others are locked; & when the weight of the slide is insufficient to carry it down quick enough I attach a spring to it to quicken its motion.

3. a third method, I make the slide, precisely as in the first method & opposite the upper edge of the drawers, I fix into it staples, & in the drawers pins or catches: I also make & finish a block as mentioned in the first method, which I attach to the back board, also in the same manner. I then pass the slide up thro the groove in the block, & then to the upper end of the slide, I attach a head or cap by which with the hand, it is raised or let down at pleasure. I then counter sink a drawer or cupboard lock into the block of wood, upon the side of the groove in such a manner, that by turning the key; the bolt of the lock is thrown into a mortise made in the slide for that purpose; & all the drawers are locked; then by turning the key back again & raising up the slide the drawers are all unlocked. The slide may also be locked up or kept up by

X5916 a spring. What I claim as new, & my own invention or discovery, is the attaching of such Slides, staples, pins &c. to the drawers & furnitures, that with one common drawer, cupboard or similar lock, I can lock & unlock any number of drawers in the same piece of furniture as heretofore described, in an easy & cheap manner. For a desk the slide may be moved up & down by the hand in which case it is placed in the back part of the head of the desk inside or it may be moved by means of a pin or cog in one of the small drawers similar to the second method mentioned in the specification, then one common lock upon the lid would be sufficient to secure every drawer in the piece. 2. a wooden bolt to a door may be locked with a common drawer or cupboard lock, in the manner described in the third method, in the specification. 3. instead of the staple & pin in the slide & drawer a hook may be let into the slide in such a position as to catch upon the edge of the drawer when the slide is thrown up or down.

Witnesses
Albert G. Moit
Ira A. Bean

Elijah Skinner

The staples may be made of wire of sufficient length to hold them fast when driven into the work & after the staple is turned in the ordinary manner, I turn the points down to form a right angle with the rest of the staple so that when it is driven into the edge of the drawer the throat of the staple projects beyond the drawer enough to receive the hook in the slide. Then cut notches in the edge of the slide & in these notches put pins of wood or iron in such a manner as to hook into the staples when the slide passes up & down, or instead of the notches in the edge of the slide, I sometimes make mortises in the front or centre of the slide into which I put pins of wood or iron so as to catch into the staples when the slide is moved up & down. The two last methods for making & setting the staples & pins I consider the most cheap & easy. I however make & set them in various ways to suit convenience.

Witnesses
Reede Varney
Ira A. Bean

Elijah Skinner

E. S.

([illegible] 13 April 1820)